(12) United States Patent
Jepperson et al.

(10) Patent No.: US 11,437,038 B2
(45) Date of Patent: Sep. 6, 2022

(54) RECOGNITION AND RESTRUCTURING OF PREVIOUSLY PRESENTED MATERIALS

(71) Applicant: INTERNATIONAL BUSINESS MACHINES CORPORATION, Armonk, NY (US)

(72) Inventors: Jacob Ryan Jepperson, St. Paul, MN (US); Zachary A. Silverstein, Austin, TX (US); Spencer Thomas Reynolds, Austin, TX (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 17/119,850

(22) Filed: Dec. 11, 2020

(65) Prior Publication Data

US 2022/0189472 A1    Jun. 16, 2022

(51) Int. Cl.
*G10L 15/22* (2006.01)
*G10L 15/26* (2006.01)
*G06F 3/16* (2006.01)
*G10L 15/30* (2013.01)

(52) U.S. Cl.
CPC ............. *G10L 15/22* (2013.01); *G06F 3/167* (2013.01); *G10L 15/26* (2013.01); *G10L 15/30* (2013.01); *G10L 2015/223* (2013.01)

(58) Field of Classification Search
USPC .................................................... 704/1–504
See application file for complete search history.

(56) References Cited

U.S. PATENT DOCUMENTS

| 5,806,078 A | 9/1998 | Hug et al. |
| 7,966,342 B2 | 6/2011 | Gross |
| 8,131,756 B2 | 3/2012 | Carus et al. |
| 9,363,217 B2 | 6/2016 | Chakra et al. |
| 10,169,393 B2 | 1/2019 | Horiuchi et al. |
| 10,249,068 B2 | 4/2019 | Brunn et al. |
| 10,698,964 B2 | 6/2020 | Castelli et al. |
| 11,107,006 B2 * | 8/2021 | Eisenzopf ................ G06N 5/04 |

(Continued)

OTHER PUBLICATIONS

"Natural Language Processing Market by Component, Deployment Mode, Organization Size, Type, Application (Sentiment Analysis and Text Classification), Vertical (Healthcare and Life Sciences, and BFSI), and Region—Global Forecast to 2024" [online] MarketsandMarkets Research Private Ltd. © 2020, retrieved from the Internet: <https://www.marketsandmarkets.com/Market-Reports/natural-language-processing-nlp-825.html>, 10 pg.

(Continued)

*Primary Examiner* — Marcus T Riley
(74) *Attorney, Agent, or Firm* — Cuenot, Forsythe & Kim, LLC

(57) ABSTRACT

Information recognition and restructuring includes analyzing electronic media content embedded in an electronic presentment structure presented to a user, and based on the analyzing, detecting portions of the electronic media content previously consumed by the user. The method includes modifying the electronic presentment structure, based on the detecting, to distinguish the electronic media content previously consumed by the user from other portions of the electronic media content.

25 Claims, 12 Drawing Sheets

(56) References Cited

U.S. PATENT DOCUMENTS

| | | |
|---|---|---|
| 2002/0078089 A1 | 6/2002 | Bade et al. |
| 2004/0093202 A1 | 5/2004 | Fischer et al. |
| 2006/0004704 A1 | 1/2006 | Gross |
| 2007/0101256 A1 | 5/2007 | Simonyi |
| 2010/0293451 A1 | 11/2010 | Carus |
| 2013/0097168 A1 | 4/2013 | Chang et al. |
| 2015/0161194 A1 | 6/2015 | Provenzano |
| 2015/0324350 A1* | 11/2015 | Bufe, III ............ G06F 40/40 704/9 |
| 2016/0162576 A1* | 6/2016 | Ariño de la Rubia ................. G06F 40/279 707/739 |
| 2018/0011868 A1* | 1/2018 | Allen ............ G06F 40/295 |
| 2020/0265339 A1* | 8/2020 | Eisenzopf ............ G06N 3/006 |
| 2021/0133581 A1* | 5/2021 | Podgorny ............ G06F 40/35 |
| 2022/0189472 A1* | 6/2022 | Jepperson ............ G10L 15/26 |

OTHER PUBLICATIONS

"Watson Natural Language Understanding," [online] International Business Machines Corporation, retrieved Oct. 30, 2020, retrieved from the Internet: <https://www.ibm.com/cloud/watson-natural-language-processing>, 3 pg.

"Build Apps with Natural Language Processing (NLP)," [online] International Business Machines Corporation, IBM Watson, retrieved Oct. 30, 2020, retrieved from the Internet: <https://www.ibm.com/watson/natural-language-understanding>, 2 pg.

"Why is some text highlighted in a shared notebook in OneNote for Windows?," [online] Microsoft © 2020, Oct. 2016, retrieved from the Internet: <https://support.office.com/en-us/article/why-is-some-text-highlighted-in-a-shared-notebook-in-onenote-for-windows-0480d39e-9849-4a04-9380-ab92c6252783>, 2 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

400

Ws hifirjm huje, njdfnjnm jiik

Frjijm jkjfkjk jk jijfk. Jmkdf joy kjkkl kjk kkkokk k jfjijkkm jijkjg kjijijkg ooiogkl. Skokok nnjjkk jkk jkoll jkoko jiok jijfm ijm jkjkkf jiji jijjkgm asdkoedmf. Tjkjdfkj kjfk jkjfkd jhjfdkkk jkjk jkijfi jkfo kkogoklf.

W hifirjm huje, njdfnjnm jiikfd

Im thjjd thuudfn s jjijfijgkm kjijgi jk jgkk f jijgj nm njkk, hfjdhk. Jmnnmd hjuf jjkjfkd asbd mansdu jklflp jdjk jjkfjdk ig jkdf erjlkd. Hn nmerno jkfrojrrs oifrpam lkop klfrpre kdkr nma jkt ldo.

G df hifirjm hfurnf huje, njdf njnm jiikfd hjtr.

Ih thjjd thuudfn s jjijfijgkm kjijgi jk jgkk f jijgj nm njkk mfkjk, hfjdhk. Jmnnmd hjuf jjkjfkd asbd mansdu jklflp jdjk jjkfjdk mnsmd ig jkdf erjlkd. Hn nmerno jkfrojrrs oifrpam lkop klfrpre kdkroo.

402

Ws hifirjm huje, njdfnjnm jiik

404

Frjijm jkjfkjk jk jijfk. Jmkdf joy kjkkl kjk kkkokk k jfjijkkm jijkjg kjijijkg ooiogkl. Skokok nnjjkk jkk jkoll jkoko jiok jijfm ijm jkjkkf jiji jijjkgm asdkoedmf. Tjkjdfkj kjfk jkjfkd jhjfdkkk jkjk jkijfi jkfo kkogoklf.

406

W hifirjm huje, njdfnjnm jiikfd rtio kjfol.

408

Im thjjd thuudfn s jjijfijgkm kjijgi jk jgkk f jijgj nm njkk, hfjdhk mnnmd hjuf jjkjfkd asbd. Mansdu jklflp jdjk jjkfjdk ig jkdf erjlkd. Hn nmerno jkfrojrrs oifrpam lkop klfrpre kdkr nma jkt ldo.

G df hifirjm hfurnf huje, njdf njnm jiikfd hjtr.

410

Ih thjjd thuudfn s jjijfijgkm kjijgi jk jgkk f jijgj nm njkk mfkjk, hfjdhk. Jmnnmd hjuf jjkjfkd asbd mansdu jklflp jdjk jjkfjdk mnsmd ig jkdf erjlkd. Hn nmerno jkfrojrrs oifrpam lkop klfrpre kdkroo.

Analyze electronic media content embedded in an electronic presentment structure presented to a user to detect, based on the analyzing, portions of the electronic media content previously consumed by the user
502

Detecting, based on the analyzing, portions of the electronic media content previously consumed by the user
504

Based on the detecting one or more portions previously consumed, modify the electronic presentment structure to distinguish portions of the electronic media content previously consumed by the user
506

Perform natural language processing (NLP) on a machine-encoded file to determine one or more file segment classifiers, wherein the machine-encoded file is retrieved via a data communications network
602

---

Detect, within the machine-encoded file, previously consumed content corresponding to the one or more file segment classifiers by performing a computer database search for NLP elements identified within electronic content previously presented to a user that match NLP elements extracted from the machine-encoded file, wherein the search is performed with respect to a user-specific consumption corpus database
604

---

Based on the detecting, modify an electronic presentment structure for presenting the machine-encoded file to a user electronically, wherein the electronic presentment structure is modified to distinguish portions corresponding to the previously consumed content within the machine-encoded file from other portions of the machine-encoded file
606

Electronically track locations of a device used to receive and present
the electronic presentment structure to the user electronically
702

Modify the electronic presentment structure based on the location
of the device
704

800

Detect one or more revisions to the machine-encoded file after retrieval of the machine-encoded file by the user
802

Responsive to the detecting one or more revisions, present the machine-encoded file using another electronic presentment structure that indicates which portions are newly added or revised
804

FIG. 8

RECOGNITION AND RESTRUCTURING OF PREVIOUSLY PRESENTED MATERIALS

BACKGROUND

This disclosure relates to electronically processing and presenting information to a user, and more particularly, to distinguishing between information newly presented to the user and information previously presented.

The advent of the Internet and other modern forms of electronic communication have greatly expanded the amount and modes of receiving information by individual consumers of information. Numerous news articles and large quantities of various other types of information can be frequently published and widely distributed electronically on various communications and computing platforms. Such information can be electronically conveyed via wired and wireless connections over various types of electronic communications networks and consumed using various types of electronic devices.

SUMMARY

In one or more embodiments, a method includes performing natural language processing (NLP) on a machine-encoded file to determine one or more file segment classifiers. The machine-encoded file can be retrieved via a data communications network. The method includes detecting, within the machine-encoded file, previously consumed content corresponding to the one or more file segment classifiers by performing a computer database search for NLP elements identified within electronic content previously presented to a user that match NLP elements extracted from the machine-encoded file, wherein the search is performed with respect to a user-specific consumption corpus database. The method includes modifying, based on the detecting, an electronic presentment structure for presenting the machine-encoded file to a user electronically. The electronic presentment structure is modified to distinguish portions corresponding to the previously consumed content within the machine-encoded file from other portions of the machine-encoded file.

In one or more embodiments, a method includes analyzing electronic media content embedded in an electronic presentment structure presented to a user. The method includes detecting, based on the analyzing, portions of the electronic media content previously consumed by the user. The method includes modifying the electronic presentment structure, based on the detecting, to distinguish the electronic media content previously consumed by the user from other portions of the electronic media content.

In one or more embodiments, a method includes detecting one or more revisions to a machine-encoded file after a prior retrieval of an earlier version of the machine-encoded file by a user via a data communications network. The detecting includes a comparison of natural language processing (NLP) elements identified within electronic content of the earlier version of the machine-encoded file and NLP elements identified within electronic content of a revised version of the machine-encoded file. The method includes, based detecting one or more revisions, presenting the machine-encoded file using another electronic presentment structure that indicates which portions are newly added or revised.

In one or more embodiments, a system includes a processor configured to initiate operations. The operations include performing natural language processing (NLP) on a machine-encoded file to determine one or more file segment classifiers. The machine-encoded file can be retrieved via a data communications network. The operations include detecting, within the machine-encoded file, previously consumed content corresponding to the one or more file segment classifiers by performing a computer database search for NLP elements identified within electronic content previously presented to a user that match NLP elements extracted from the machine-encoded file, wherein the search is performed with respect to a user-specific consumption corpus database. The operations include modifying, based on the detecting, an electronic presentment structure for presenting the machine-encoded file to a user electronically. The electronic presentment structure is modified to distinguish portions corresponding to the previously consumed content within the machine-encoded file from other portions of the machine-encoded file.

In one or more embodiments, a computer program product includes one or more computer readable storage media having instructions stored thereon. The instructions are executable by a processor to initiate operations. The operations include performing natural language processing (NLP) on a machine-encoded file to determine one or more file segment classifiers. The machine-encoded file can be retrieved via a data communications network. The operations include detecting, within the machine-encoded file, previously consumed content corresponding to the one or more file segment classifiers by performing a computer database search for NLP elements identified within electronic content previously presented to a user that match NLP elements extracted from the machine-encoded file, wherein the search is performed with respect to a user-specific consumption corpus database. The operations include modifying, based on the detecting, an electronic presentment structure for presenting the machine-encoded file to a user electronically. The electronic presentment structure is modified to distinguish portions corresponding to the previously consumed content within the machine-encoded file from other portions of the machine-encoded file.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 depicts an example electronic presentment structure and a modified electronic presentment structure according to an embodiment.

FIG. 5 is a flowchart of an example method of recognizing and presenting information electronically according to an embodiment.

FIG. 6 is a flowchart of an example method of recognizing and presenting information electronically according to an embodiment.

FIG. 8 is a flowchart of an example method of detecting updates to portions of information previously presented to a user electronically according to an embodiment.

DETAILED DESCRIPTION

Figure 1:
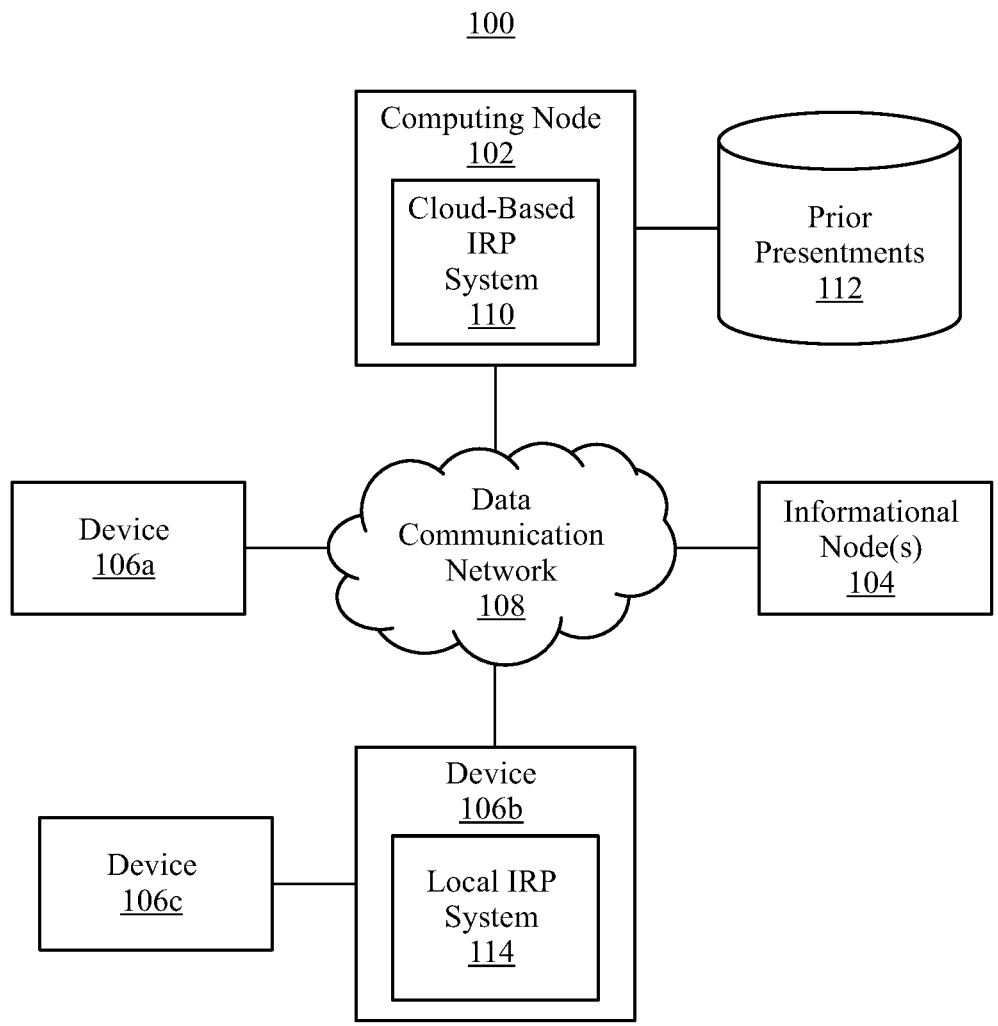
FIG. 1 depicts an example computing environment in which one or more information recognition and presentation systems are used according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronically processing and presenting information to a user, and more particularly, to distinguishing between information newly presented to the user and information previously consumed by the user. A seemingly ever-expanding array of electronic communications technologies and information sources provide greater access to greater quantities of information. Notwithstanding the benefits of rapid access to vast quantities of information, the quantity of information can reach a point of diminishing returns for individual consumers of the information. For example, an evolving current event may prompt multiple news articles. Some of the numerous articles, however, may merely regurgitate the same facts. An individual thus must wade through a considerable amount of material just to discover what portions of the information the individual has already consumed and what portions are new.

An aspect of the systems, methods, and computer program products disclosed herein is the automated discovery of information already consumed by a user, relieving the user of the need to re-read, listen again, or watch anew materials previously presented electronically to the user. Another aspect is restructuring an electronic presentment structure that contrasts, compresses, or eliminates portions of information previously presented to the user as electronic content. "Electronic content," as defined herein is any information or data that is presented in a machine-encoded file, which can be electronically stored and/or processed by a computer system. Information presented as electronic content can include news articles, educational materials, scholarly journals, human interest stories, entertainment materials, and the like. A machine-encoded file for presenting electronic content can be formatted as an electronic document, an audio file, a video file, or any combination thereof. As defined herein, an "electronic presentment structure" is any text, image, audio, or video embedded in a machine-encoded file that is electronically received or generated and presented to a user using an electronic device. The electronic device, for example, can be a desktop or laptop computer, a tablet, a smartphone, or similar such device capable of receiving via a wired and/or wireless connection text, images, audio, and/or videos.

The systems, methods, and computer program products disclosed herein detect within a given quantity of electronic content distinct portions of the electronic content previously consumed by a user. As defined herein, a user "consumes" electronic content by retrieving the electronic content embedded in an electronic document, audio file, or video file via a data communications network, or—in the context of a system that enables a user to tag content upon reading, listening to, or viewing the content—by tagging the article to indicate the user's having read, listened to, or viewed the electronic content. As the user consumes electronic content from various sources in different forms (e.g., text, audio, video), the electronic content consumed is added to a database comprising a user-specific consumption corpus for comparison with subsequently presented information to avoid repetitive presentment of already-consumed electronic content.

Various machine learning and natural language processing techniques disclosed herein, in different arrangements, determine one or more file segment classifiers within a machine-encoded file. The one or more file segment classifiers classify distinct segments of newly presented electronic content and correspond to distinct topics identified by topic analysis. With respect to each identified topic, the corresponding segment of electronic content can be compared with previously consumed electronic content to determine whether any topic-specific segments of the newly presented electronic content are identical to or sufficiently similar with previously consumed content pertaining to the same topic.

Based on the detecting, an electronic presentment structure for presenting the electronic content in a machine-encoded file is modified. The electronic presentment structure is modified to distinguish portions corresponding to the previously consumed portions of electronic content within the machine-encoded file from other portions of the machine-encoded file. This enables the user to avoid re-reading, re-hearing, or viewing anew information previously presented as electronic content to the user. For example, with a textual presentment of electronic content, the electronic presentment structure can be annotated by highlighting or rendering text in different colors or styles to distinguish newly presented content from content previously consumed. In an audio presentment, for example, portions of audio pertaining to previously presented content can be eliminated, skipped, or sped through rapidly. In a video-based presentment, for example, portions of the video pertaining to previously presented content likewise can be skipped or sped through. By re-formatting and/or annotating an electronic presentment structure can be restructured to distinguish previously consumed electronic content from newly presented electronic content. Optionally, restructuring can include annotating the electronic content to indicate the portion of electronic content previously consumed.

The arrangements described herein are directed to computer technology and provide an improvement to existing computer technology. One such improvement pertains to the mitigation of wastage of computing resources. Ever-increasing quantities of information are disseminated as electronic content. The greater the quantity of electronic content, the greater the expenditure of computing resources for electronically storing and processing the information embedded therein. The arrangements described herein enhance computer system processing efficiencies and lessen data storage requirements by reducing the processing and storage of electronic content that merely duplicates information already consumed by a user.

For example, with respect to any computing device (e.g., desktop computer, laptop, tablet, smartwatch), the arrangements improve the computer technology by avoiding unnecessary use of computing resources in processing and presenting duplicative electronic content. Reducing the need to process repetitive electronic content enhances processing efficiency of a computing device. By avoiding data storage of electronic content already consumed, available storage capacity of the computing device enhanced commensurately. Computer and device hardware thus perform more efficiently by avoiding the retrieving, storing, and processing of information already consumed by a user.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 11:
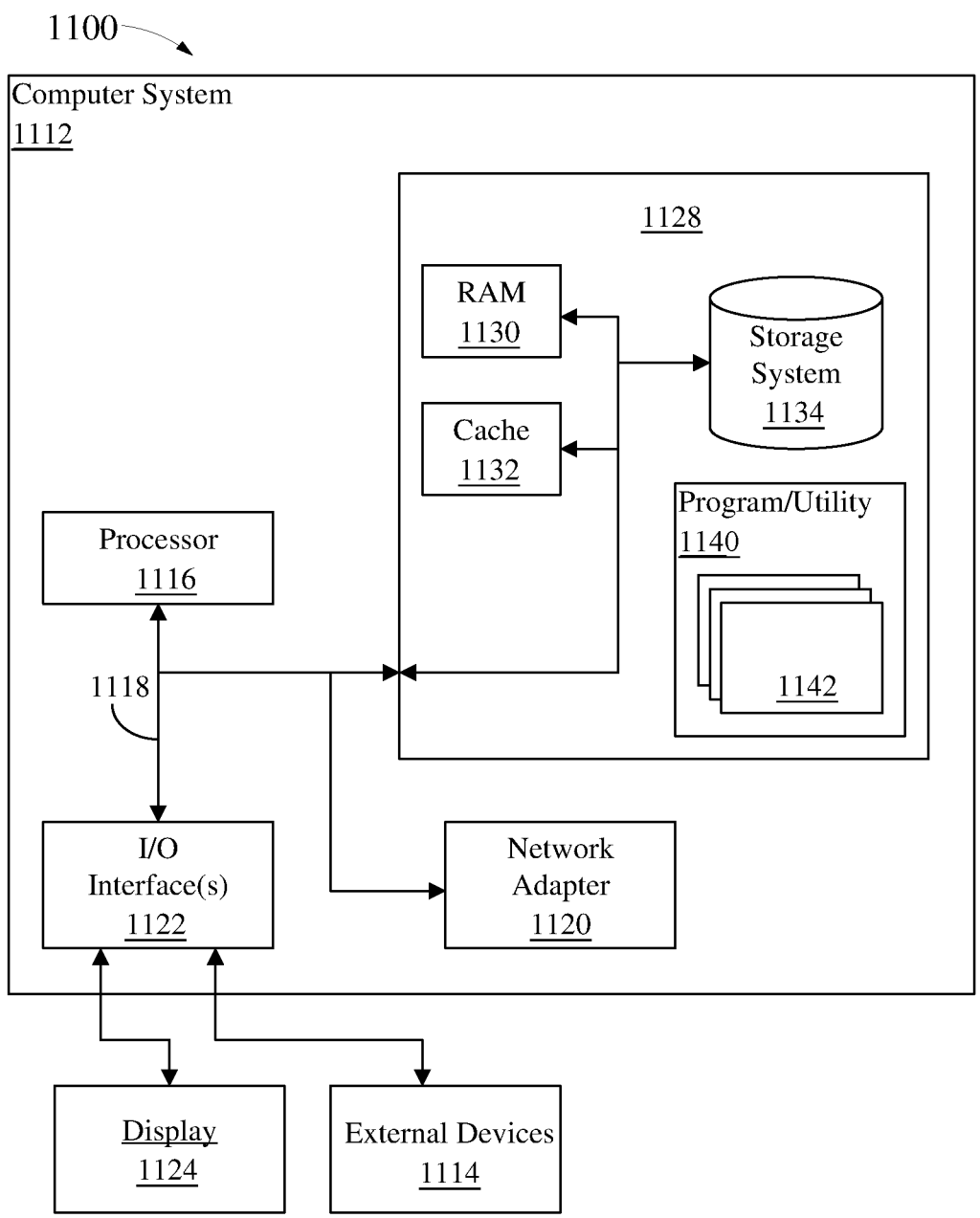
FIG. 11 depicts a cloud computing node according to an embodiment.
Figure 12:
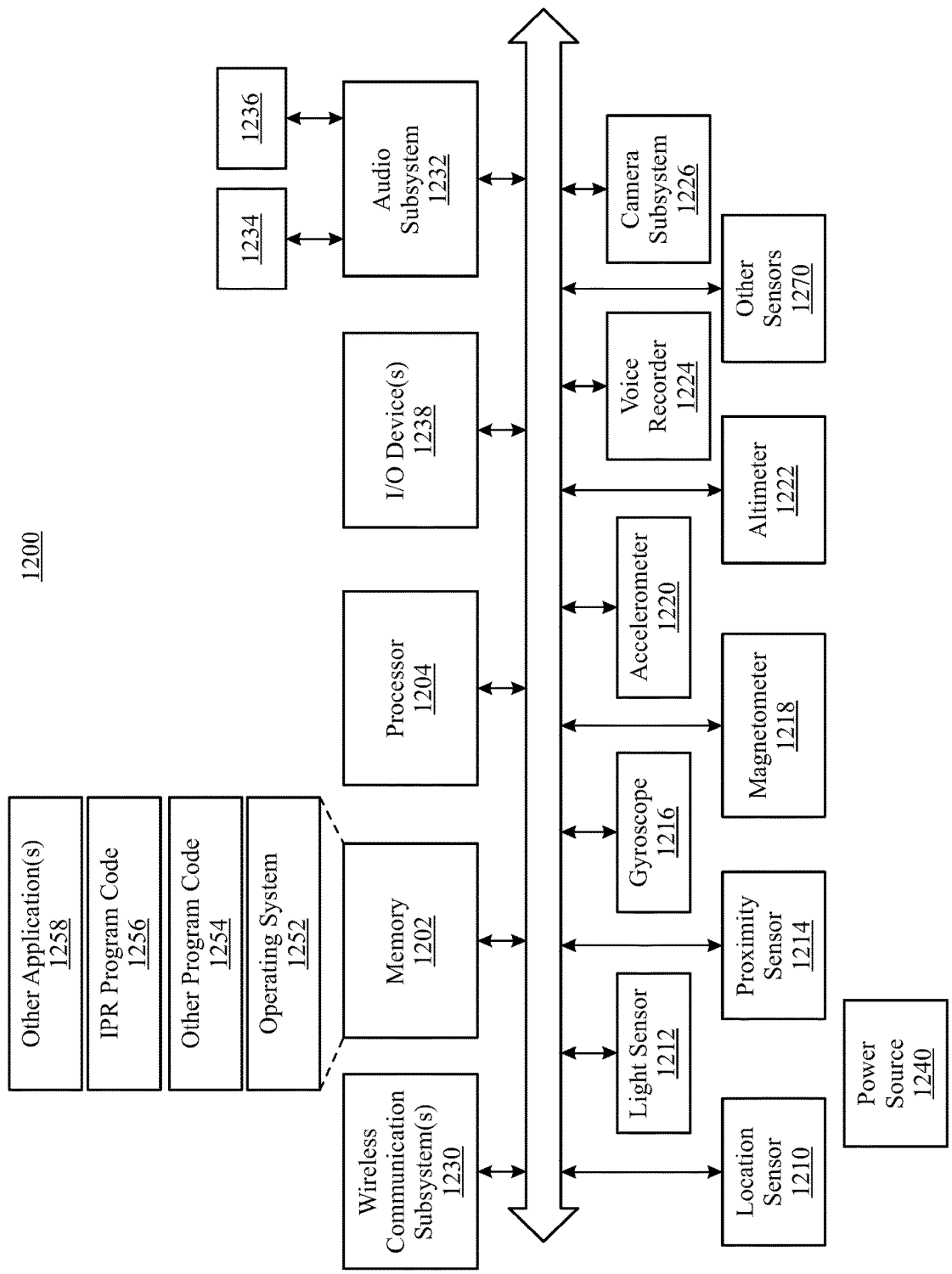
FIG. 12 depicts an example portable device according to an embodiment.

FIG. 1 depicts computing environment 100. Computing environment 100 illustratively includes computing node 102, one or more informational nodes 104, and devices 106a, 106b, and 106c that are communicatively coupled via data communications network 108. Computing node 102 and informational node(s) 104 can each include one or more of the hardware components described with reference to example computing node 1100, which includes computer system 1112 (FIG. 11). Devices 106a-106c can comprise computer systems (e.g., desktop computer) having a memory, one or more processors, and other hardware components such as one described with reference to computer system 1112 (FIG. 11). One or more of devices 106a-106c can be a portable device (laptop computer, tablet, smartphone) such as example portable device 1200 (FIG. 12). Although three devices are shown, an environment such as computing environment 100 typically includes many more such devices. Operatively, users of devices 106a-106c electronically access electronic content embedded in machine-encoded files such as electronic documents, audio files, video files, and various other media hosted by informational node(s) 104 and accessed via wired or wireless connections to data communications network 108. The various media convey various types of electronic content, including news articles, educational materials, human interest stories, entertainment materials, and the like. Data communications network 108 typically includes the Internet but can include wide area networks (WANs), local area networks (LANs), and various other data communications networks over which electronic documents, audio, video, and various other media can be accessed and retrieved.

The quantity of information available from informational node(s) 104 to users of devices 106a-106c over data communications network 108 can be substantial. Given the quantity of information a device user can electronically retrieve as electronic content from informational node(s) 104 via data communications network 108, there are times when information electronically presented to the device user is duplicative, in whole or in part, of information previously presented. For example, a tablet user may wish to catch up on news of a current event by accessing several articles whose text is generated by different news organizations. The user may have been following developments pertaining to the event for some time, and some articles may merely reiterate facts already read by the user. In another context, for example, a computer user attending college online may be assigned several instructional videos for viewing. Some or all the instructional videos assigned to the user may include portions that cover the same or substantially similar materials.

In these and other situations, an informational recognition and presentation (IRP) system according to the various embodiments described herein can relieve a device user of unnecessarily expending time and energy sorting through electronic content in various forms (e.g., text, audio, video) to separate newly presented information from information previously presented.

The IRP system analyzes electronic media content embedded in an electronic presentment structure presented to a user. Based on the analyzing, the IRP system detects portions of the electronic media content previously consumed by the user. The IRP system, based on detecting one or more portions previously consumed by the user, modifies the electronic presentment structure to distinguish the electronic media content previously consumed by the user from other portions of the electronic media content.

An IRP system also improves the efficiency of the underlying computer system or device hardware by reducing the need to store, retrieve, and process electronic content already consumed by a user. When a user retrieves electronic content electronically as a machine-encoded file, the IRP system identifies distinct portions of the machine-encoded file that correspond to previously consumed content.

In certain embodiments disclosed herein the IRP system implements natural language processing (NLP) and other machine learning aspects in identifying distinct portions, or segments, of a machine-encoded file, the segments identified by file segment classifiers that each correspond to a specific topic of the information presented as electronic content. The IRP system detects, within the machine-encoded file, the previously consumed content corresponding to the one or more file segment classifiers. The previously consumed content is detected by performing a computer database search for NLP elements identified within electronic content previously presented to a user that match NLP elements extracted from the machine-encoded file. The search is performed with respect to a user-specific consumption corpus database, which additionally supports machine learning implemented with the IRP system.

Based on the detecting, the IRP system modifies an electronic presentment structure (e.g., electronic document, audio file, video file) for presenting the machine-encoded file to a user electronically. The electronic presentment structure can be modified to distinguish portions corresponding to the previously consumed content within the machine-encoded file from other portions of the machine-encoded file.

For an electronic presentment structure that comprises text, the IRP system can modify the electronic presentment structure by annotating the text to distinguish portions of the text corresponding to portions of the electronic media content previously consumed by the user from other portions of the text. Additionally, or alternatively, in certain embodiments the IRP system can modify one or more formatting tags to alter the format of the text corresponding to portions of the electronic media content previously consumed by the user from other portions of the text. In other embodiments, the IRP system additionally or alternatively extracts portions of the text corresponding to portions of the electronic media content previously consumed by the user. Optionally, the IRP system can substitute a link for the portions extracted. The link can electronically link the user to a database wherein the portions extracted are electronically stored. The IRP system can provide an instruction instructing the user link to the database if the user wishes to restore to the electronic presentment structure the portions extracted. The IRP system optionally can also communicate to the user an indicator indicating when or how long ago the user consumed the extracted portions.

For an electronic presentment structure that comprises an audio or video file, the IRP system can modify the electronic presentment structure by accelerating the speed of the audio or video rendering speed with respect to the portions of the electronic media content previously consumed by the user. Additionally, or alternatively, the IRP system in other embodiments can condense the audio or video to eliminate the portions of the electronic media content previously consumed by the user. The IRP system can effect a rendering of the audio or video at normal speed for those portions determined not to have been previously consumed by the user.

Illustratively, within computing environment 100, IRP system 110 is implemented as a cloud-based system integrated in or operatively coupled to computing node 102, which can be a cloud-based server. IRP system 110 can be implemented in hardware, software, or a combination of both. Performing the operations and functions described herein, IRP system 110 compares electronic presentment structure(s) (e.g., electronic documents, audio, video) newly presented to a user with prior presentments 112 previously presented to the user and electronically stored in a database accessible to IRP system 110. IRP system 110, based on the comparison, distinguishes portions of information previously consumed by the user from new information electronically presented to the user. IRP system 110, implemented as a cloud-based system, is accessed via data communications network 108 by a user using device 106a or other electronic device communicatively coupled to data communications network 108.

IRP system 114, in an alternative arrangement, is a localized IRP system implemented in device 106b. IRP system 114 can perform the same or similar operations and functions as IRP system 110 but is implemented in device 106b rather than a cloud-based server as with IRP system 110. For example, IRP system 114 can comprise a computer application that is downloaded to device 106b (e.g., desktop, laptop, tablet, smartphone). Optionally, IRP system 114 in performing the operations and functions described herein can store prior presentments (e.g., electronic documents, audio, video) locally as well. IRP system 114, alternatively, can access separately stored prior presentments 112 via data communications network 108. Device 106c can be another device used by the same user. IRP system 114 operating on device 106b can operatively couple to device 106c for performing the same operations and functions with respect to electronic presentment structures presented to the user on device 106c.

Figure 2:
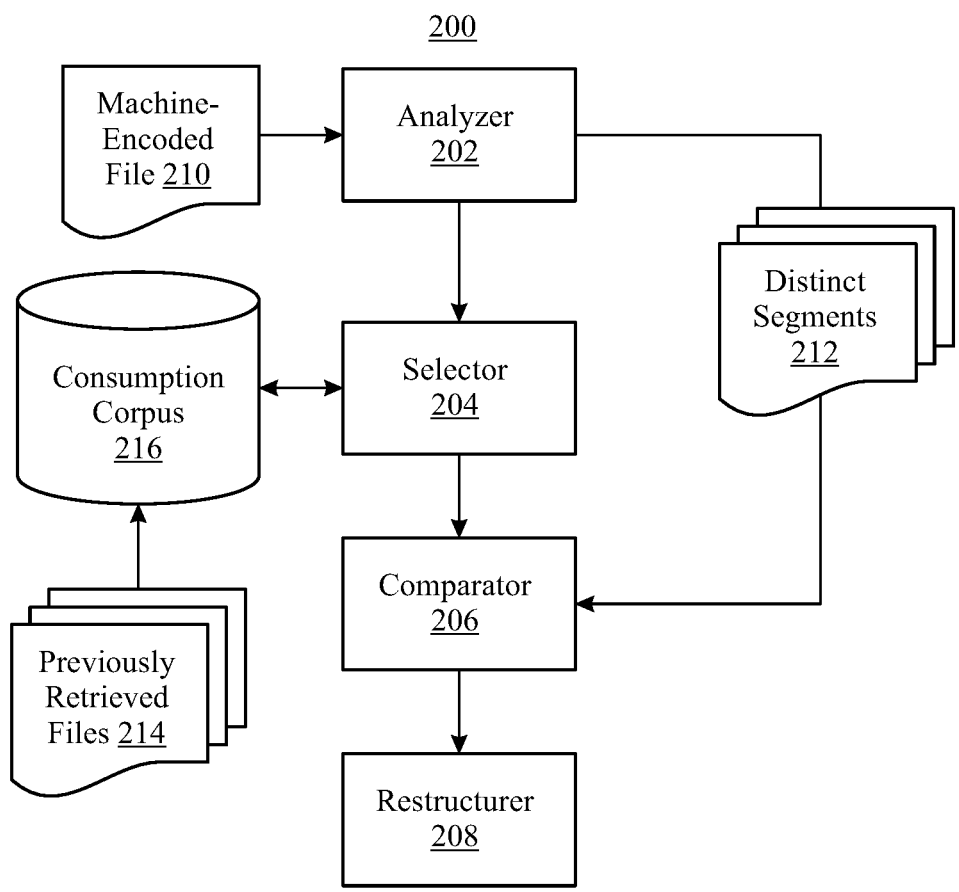
FIG. 2 depicts an example information recognition and presentment system according to an embodiment.

FIG. 2 depicts in greater detail certain example components of IRP system 200 according to an embodiment. IRP system 200 is implemented in distinct software modules. Illustratively, the modules include analyzer 202, selector 204, comparator 206, and restructurer 208. The modules comprising IRP system 200 process a machine-encoded file retrieved by a user electronically, the machine-encoded file can comprise electronic content presented to the user as an electronic document, an audio rendering, a video, or other electronic presentment structure. Operatively, IRP system 200 processes textual data embedded in the machine-encoded file. The textual data can thus be contained in an electronic document (e.g., webpage, online news article, message) or converted from speech (e.g., prerecorded audio, audio portion of a video) by a speech-to-text processor (not shown).

IRP system 200, in different embodiments, integrates various aspects of machine learning. Analyzer 202 identifies topics within an article based on topic analysis of the electronic content embedding in a machine-encoded file. Analyzer 202 implements natural language processing to parse the electronic content into constituent elements of text, evaluate the meaning of the text, and resolve inherent ambiguities. The natural language processing by analyzer 202 can include semantic analysis and/or word-sense disambiguation based on tokenization, lemmatization, and/or part-of-speech tagging.

Analyzer 202 incorporates natural language understanding using deep learning, which in certain embodiments described herein is implemented in a multi-hidden layer neural network. Using a multi-hidden layer neural network, analyzer 202 performs text analysis to extract from a given text keywords, concepts, categories, relations, sentiments, emotions, syntax, and other natural language elements. As defined herein, a "natural language processing (NLP) element" is any object that based on natural language processing is detected in or derived from (explicitly or implicitly) a text and that at least partially explains the natural language meaning of a specific segment of the text. NLP elements, as described below, include keywords, concepts, relations, and the like, as well as semantical and syntactical objects. Analyzer 202, in certain embodiments, performs text analysis to detect keyword frequency and extract phrases that frequently occur in conjunction with one another from unstructured text. The text analysis is performed by analyzer 202 in analyzing machine-encoded file 210 in conjunction with a machine learning model trained to identify one or more topics corresponding to distinct segments 212 of machine-encoded file 210.

In certain embodiments, analyzer 202 determines one or more file segment classifiers contained within machine-encoded file 210 by performing NLP. Each file segment classifier corresponds to a distinct portion, or segment, of machine-encoded file 210 that pertains to a specific topic of the information, as electronic content, embedded in machine-encoded file 210. The information contained in distinct segments 212 may cover multiple topics.

Analyzer 202, in some embodiments, implements topic modeling, an unsupervised machine learning technique, to determine the topic(s) corresponding to the file segment classifiers. Implementing topic modeling, analyzer 202 groups texts based on the words each contains and the observed correlations among them. In certain embodiments, analyzer 202 implements topic modeling using latent semantic analysis, which based on the distributional hypothesis groups the texts based on the frequencies with which the same words occur within each of the texts. In other embodiments, analyzer 202 implements topic modeling using latent Dirichlet analysis, a generative statistical model that maps texts to topics and groups the texts such that words in each text are captured (or nearly so) by the topics.

Topic modeling based on unsupervised machine learning is well suited for discovering topics that are of interest to a user, though not explicitly designated by the user. If, however, the user specifies topics of interests, analyzer 202 can implement supervised machine learning to train a classification model to classify distinct portions of information based on predetermined topics. For example, the user upon consuming (e.g., reading, listening to, viewing) an electronic presentment (e.g., document, audio, video) of information (electronic content), can label, or tag, the electronic presentment according to a topic identified by the user. The labeled electronic presentment can be added to a corpus of labeled training examples and electronically stored. In certain embodiments, analyzer 202 implements a deep learning neural network classification model that is trained using the user-labeled electronic presentments to classify distinct portions of electronic content according to topic.

Accordingly, in some embodiments, IRP system 200 provides a user the option of having the system learn through unstructured machine learning (e.g., topic modeling) to discover topics of interest to the user. Alternatively, the user has the option of explicitly designating topics of interest, which the user can do by labeling electronic presentments as the user consumes the information conveyed in the electronic presentments. By labeling the electronic presentments, the user builds a corpus of labeled training examples that are used to train a classification model (e.g., deep learning neural network) to identify topics of specific interest to the user. Moreover, regardless whether or not any specific topic is of particular interest to the user, IRP system 200 in various embodiments described herein detects and identifies previously consumed content to thereby enable the user to skip or otherwise avoid content already consumed.

Based on topics determined by analyzer 202, selector 204 retrieves electronically stored topic-specific data. The structure of the data can comprise NLP elements generated based on natural language processing of electronic files 214 previously retrieved by the user. The data structures comprise a user-specific consumption corpus electronically stored in consumption corpus database 216—that is, previously read, heard, or viewed electronic content—stored electronically in a relational or non-relation database. The data structures correspond to text extracted from electronic documents or converted from audio by a speech-to-text processor. The data structures also can include timestamps indicating the date that the corresponding information was presented to the user.

Selector 204 performs a computer database search of consumption corpus database 216 for NLP elements identified within electronic content in previously presented files 214 to identify NLP elements that match NLP elements extracted from machine-encoded file 210. Based on a match, selector 204 can select topic-specific segments of previously presented electronic content for comparison with topic-specific distinct segments 212 of machine-encoded file 210.

Optionally, based on a user-supplied instruction, selector 204 can select from among previously presented files 214 only those files previously presented to the user within a specific time interval. Thus, for a specific user, electronic comparison of information is according to both topic as well as the period in which the information was consumed by the user. For example, the user may specify that newly presented information be compared with information consumed over the last week, last month, last year, or any other period, which also can reflect the user's intensity of interest in certain topics.

For each of the one or more topics determined by analyzer 202, comparator 206 compares distinct segments 212 with corresponding topic-specific content contained in articles electronically stored in consumption corpus database 216 and retrieved by selector 204 based on topics identified by analyzer 202. Comparator 206 compares NLP elements extracted by analyzer 202 from distinct segments 212 and NLP elements extracted from previously retrieved files 214 electronically stored in consumption corpus database 216.

NLP elements are extracted by analyzer 202, which performs a text analysis of distinct segments 212 of retrieved machine-encoded file 210 as well as previously consumed texts whose topic(s) correspond to the topic(s) of the machine-encoded file 210. Based on natural language understanding, analyzer 202 identifies and extracts NLP elements such as names, places, and events. Analyzer 202 also extracts keywords. Analyzer 202 also extracts concepts. Concepts are high-level characterizations of topics and ideas expressed in text. For example, if machine-encoded file 210 comprises a research paper on deep learning, analyzer 202 can extract the concept "Artificial Intelligence" even though neither "artificial" nor "intelligence" is expressly stated in the text. Analyzer 202 also extracts relations among NLP elements. For example, if machine-encoded file 210 comprises a news article about the Nobel Prize that includes NLP elements "Nobel Prize in Physics" and name "Andrea M Ghez," analyzer 202 can connect the NLP elements by the relation "awarded to."

Analyzer 202 also classifies NLP elements. In some embodiments, analyzer 202 generates a classification hierarchy of text topics (e.g., finance/financial news, computer/operating system/hardware). Analyzer 202 can also classify text based on NLP elements of sentiment (e.g., positive, negative, neutral) and/or emotion (e.g., joyful, sad, angry, frustrated).

Based on a topics-based comparison of NLP elements of machine-encoded file 210 and NLP elements of previously retrieved files 214, comparator 206 identifies which of distinct segments 212 of machine-encoded file 210 comprise information previously consumed. A distinct segment of machine-encoded file 210 may reiterate word-for-word a portion pertaining to the same topic identified in a previously retrieved file, in which event, the distinct segment of machine-encoded file 210 is identified by comparator 206 as previously consumed content. In other situations, however, though there may not be a word-for-word identity between a distinct segment of machine-encoded file 210 and a previously retrieved file segment pertaining to the same topic, the similarity between segments may be sufficient for comparator 206 to identify the distinct segment of machine-encoded file 210 as previously consumed content.

The similarity can be determined based on a similarity analysis performed by comparator 206 comparing corresponding NLP elements extracted from the respective files. For example, the percentage of NLP elements that are common to both files can be determined by comparator 206. Based on the percentage, comparator 206 can determine a probability that the respective segments are duplicative. Similarity sufficient for comparator 206 to identify the distinct segment of machine-encoded file 210 as previously consumed content can be based on the probability exceeding a certain level (e.g., 80 percent) predetermined by the user.

Note therefore that based on topic analysis and natural language understanding, IRP system 200 is able to identify previously consumed content that appears in a newly presented machine-encoded file even though a side-by-side comparison of topic-specific segments might not reveal that previously retrieved content covered essentially the same material, albeit presented in a different way. For example, a newly retrieved financial news article may comprise text differently written than a previously retrieved news article. A comparison of NLP elements such as keywords or terms (e.g., names, dates, numerical values) and/or concepts (e.g., monetary policy) and/or relations (e.g., monetary policy and interest rates), however, can reveal that a high percentage (e.g., 90 percent) of the identical NLP elements appear in both articles, rendering the latter of the articles essentially duplicative of the earlier-retrieved article.

IRP system 200, in certain embodiments, generates a similarity metric such as the percentage of identical or common NLP elements to determine whether one or more of distinct segments 212 comprises information previously consumed by the user. IRP system 200 also can include an offset to the similarity metric based, for example, on sentiment and/or emotion. A similarity metric offset is a negating factor that reduces the similarity metric between two or more articles that are otherwise similar save for differences in sentiment and/or emotion. The underlying notion is that such articles, though reciting common facts may offer contrasting viewpoints on the same set of facts. For example, two articles comprising editorial opinions on the same subject likely contain a degree of similarity with respect to NLP elements. If each takes a different view, however, the sentiment and/or emotion of each will most likely be different. IRP system 200, accordingly, discounts the similarities and concludes based on differences in the sentiment and/or emotion that the material in the latter-retrieved article was not consumed previously. Sentiment and emotion, as well as other NLP elements, can be electronically stored within the consumption corpus.

The operations and functions cooperatively performed by analyzer 202, selector 204, and comparator 206 can be performed on text derived directly or through speech-to-text processing from any medium (e.g., electronic documents, audio, video). Likewise, a user-specific consumption corpus consolidates data structures corresponding to text derived from different media. Thus, information newly presented in one medium can be compared with information previously presented in an entirely different medium. For example, information newly presented in an electronic presentment structure comprising an electronic document can be compared with information previously presented in another electronic presentment structure, including audio or video as well as other electronic documents. IRP system 200 thus is capable of mixed-medium content comparisons of information electronically presented to a user. A user who begins a novel listening to an audio book rendering and stops at some point, for example, can resume the storyline by reading electronic text on a tablet wherein the electronic content is annotated to indicate where the user stopped listening to the audio book. Thus, IRP system 200 can indicate the portion of the novel heard with the audio book and enable the user to resume with newly presented portions of the novel reading from the tablet.

In other embodiments, IRP system 200 additionally or alternatively identifies distinct portions of newly presented information that correspond to previously presented information based on metadata that corresponds to an electronic document, audio, video, or other electronic presentment structure presented to the user. For example, metadata corresponding to an electronic document may indicate the version or publication date of the document. If the electronic document is subsequently revised, for example, by updating old information (e.g., proper names, dates, numerical values) or adding new information, a comparison of the metadata corresponding to the earlier- and latter-published versions can prompt comparator 204 to determine the changes between the two versions. In yet other embodiments, IRP system 200 additionally or alternatively captures URL hyperlinks of online publications consumed by the user, storing the content in a relational or non-relational database for later comparisons of successive changes to the information contained therein with each updating of content.

Restructurer 208 modifies an electronic presentment structure based on comparator 206 detecting distinct portions of information presented corresponding to previously presented information. For information presented as text, restructurer 208 can annotate the text of the electronic document to contrast those portions of the information previously presented with portions newly presented to the user. In some embodiments, restructurer 208 highlights the text using different colors, fonts, and/or stylistic variations (e.g., bolding, italics, strikethroughs), and/or backgrounds that contrast newly presented portions with previously presented portions. In some embodiments, restructurer 208 compresses the text, eliminating portions identified as having been previously presented to the user.

In certain embodiments, electronic presentment structures comprising audio or video are modified by restructurer 208 condensing the structure to eliminate the distinct portions corresponding to previously presented information. In other embodiments, restructurer 208 changes the presentation speed of the portions of audio or video containing the previously presented information. Restructure 208 can alter the speed of presentation such that the audio or video speeds through or skips those portions previously heard or seen without the user having to hear or see the portions again. Restructurer 208 causes the audio or video to render portions determined to be newly presented at the normal speed.

For example, a user interested in a particular subject may engage in reading electronic documents retrieved electronically, watching videos, and listening to audio podcasts. As the user develops greater and greater understanding of the subject, the user wishes to consume new materials rather than re-reading, re-viewing, or listening again to previously consumed content. IRP system 200 continuously updates consumption corpus database 216 as the user consumes more content on the same subject. When the user listens to a podcast on the subject, restructurer 208 advances the audio (e.g., by 7 minutes) to begin the audio at the point that new material is introduced. In watching a video on the subject, restructurer 208 can speed the video presentation (e.g., 2X normal speed) through portions corresponding to previously consumed content, and then slow the video presentation to normal speed at the point that newly presented content begins. When the user retrieves an electronic document on the subject, restructurer 208, annotates information that is duplicative of that previously consumed (e.g., from other electronic texts, prior audio, or prior video) and highlights, annotates, or otherwise distinguishes the newly presented information from that previously consumed.

In certain embodiments, IRP system 200 recognizes metadata associated with a document, audio, or video wherein the metadata indicates that the information presented therein is pertinent to a specific location (e.g., GPS coordinates) of the device that renders the electronic presentation of the information. For example, a user may move among multiple sites on a factory floor reading electronic documents that are wirelessly captured using a tablet or other device capable of receiving and processing wireless signals. The user may be required to review a set of usage and safety documents at each site regardless of whether the information has been read before at another site, the goal being to ensure that the information presented is reviewed every time the user visits a specific site. Based on the metadata recognized by IRP system 200, IRP system 200 at each site can highlight specific portions of a corresponding electronic document to indicate specific portions of information that comprise required reading. Device location data (e.g., GPS coordinates) can be included in a content request sent by the device in requesting the content. A plugin, for example, may include such data. A comparison of device location data with any other data associated with the requested content that is location related can be used by IRP system 200 in modifying the electronic presentation structure.

In other embodiments, IRP system 200 tracks the context in which information is presented in various media (e.g., document, audio, video) such that previously presented information is treated differently by the system depending on the context in which the information is presented. The user is able to constrain the modification of an electronic presentation structure given a contextual basis of an article, the contextual basis determined from keywords, concepts, relations, or other NLP elements extracted by IPR system 200, as described above. As defined herein, "contextual basis" is a topic, sub-topic, or concept determined by natural language processing that characterizes an article, in whole or in part, based on an overarching theme. For example, a user may want to track information consumed in articles about the economic impacts of COVID-19 but not want to read a repeated fact in a new article about the economic impacts of COVID-19. Nevertheless, the user may still want to see the same facts repeated if presented in the context of a new topic, such as articles on Major League Baseball. IPR system 200 modifies an electronic presentation structure of an article if the contextual basis of the article is economic impact, but not if the contextual basis is Major League Baseball. Accordingly, the user can specify with a machine-encoded instruction that restructurer 208 restructure an electronic presentation structure pertaining to a topic if presented in one context (e.g., economic impact) but not another (e.g., professional sports).

In yet other embodiments, the user can specify with machine-encoded instructions that IRP system 200 electronically tag information with a purpose and/or date indicator to indicate when the user consumed information and why. For example, a user engaged in online learning can specify that material consumed on November 3 was for the purpose of a specific assignment. When the same information is newly presented in a subsequently generated electronic presentation structure, restructurer 208 can annotate the text or otherwise notify the user of when and/or why the same information was previously consumed. Restructurer 208 for information conveyed in audio or video also can generate a recording indicating to the user the portions of audio already heard or portions of video already viewed. Optionally, in the context of online learning, for example, IPR system 200 can generate a credit assigned to the user as each new assignment is consumed if the corresponding material was not previously consumed by the user.

In still other embodiments, IRP system 200 can track the quantity of information contained in an electronic presentation structure that was previously presented. IRP system 200 can generate a metric that indicates the percentage of the information contained in an article that was previously consumed. For example, an electronic presentation structure comprising text can contain an annotation indicating the percentage of the text contained in the electronic presentment structure that corresponds to the previously presented information. For example, in response to a user retrieving an online article via a data communications network, IRP system 200 can convey an electronic message to the user specifying a corresponding "relationship score," which indicates the portion of the article previously consumed. IRP system 200, can inquire whether, given the relationship score, the user wishes to view the online article or wishes to negate the request to access the article.

Similarly, an electronic presentment structure comprising audio or video, can include a prerecorded indicator announcing to the user the percentage of the audio or video previously consumed by the user. The user thus can decide whether an article, audio, or video contains a quantity of newly presented information sufficient to warrant spending time reading, listening, or viewing the electronic presentment structure.

Figure 3:
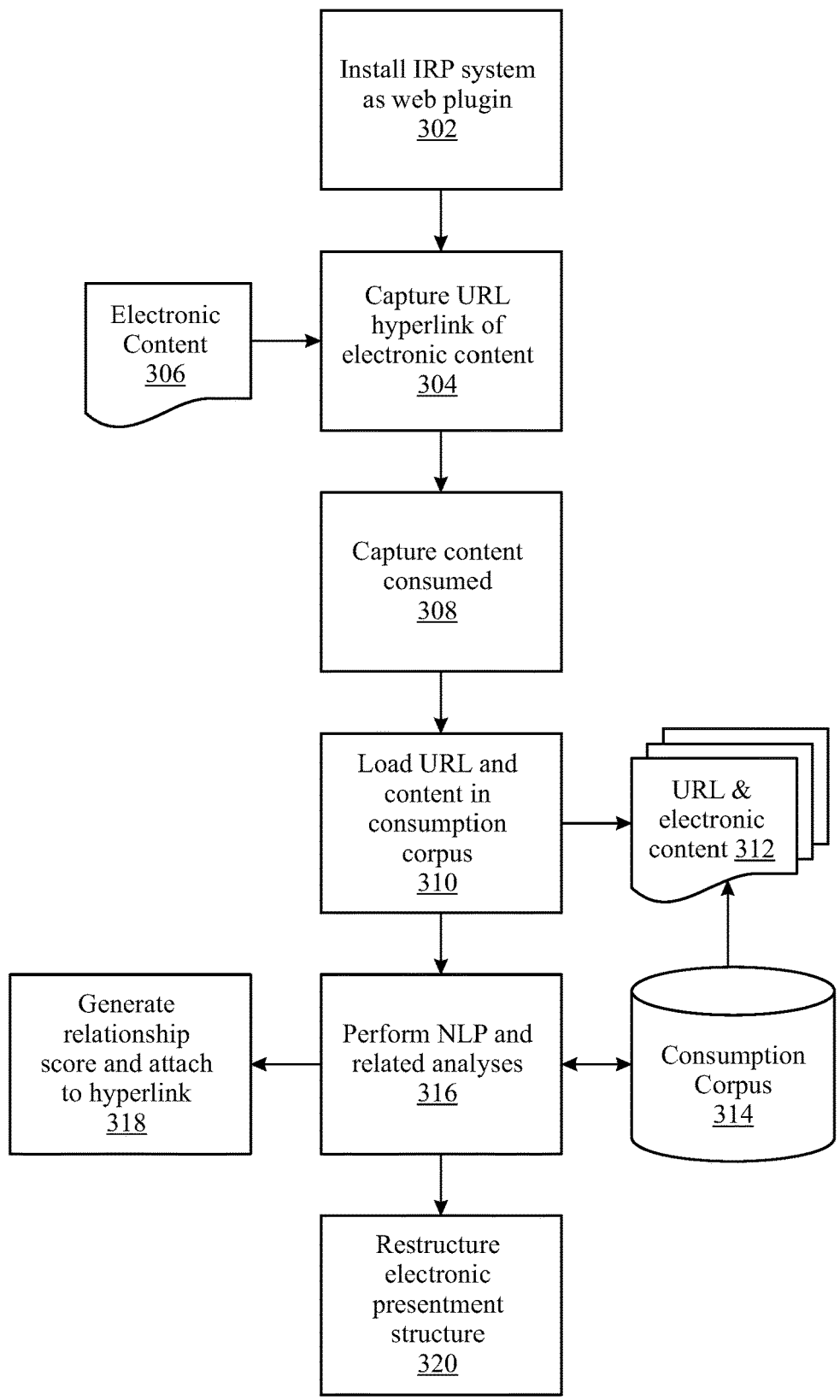
FIG. 3 depicts certain operative features of an example information recognition and presentment system according to an embodiment.

FIG. 3 depicts certain operative aspects 300 of an IRP system, which according to one embodiment is implemented in a software module or suite of modules that serve as add-ons to a web browser. A user at block 302 installs the IRP system web plugin. In various embodiments, the plugin can function as part of a cloud-based IRP system such IPR system 110 (FIG. 1) and/or an IPR system such as IPR system 114 (FIG. 1). The IRP system at block 304 captures a URL hyperlink to electronic content 306 in response to the user accessing and retrieving via a data communications network a machine-encoded file containing electronic content 306. The machine-encoded file can be formatted as an electronic document, an audio file, or a video file. At block 308, the IRP system captures electronic content 306 and together with the URL hyperlink at block 310 electronically stores data structure 312, comprising the URL hyperlink and electronic content of the machine-encoded file, in a database containing consumption corpus 314. The IRP system at block 316 performs one or more of the various types of NLP and related analyses described above to determine whether any portions of electronic content 306 were previously consumed by the user.

The determination can be based on matching NLP elements extracted from electronic content 306 with NLP elements identified within electronic content stored in consumption corpus 314. If the IRP system is cloud based, the IPR system can function as a proxy, and a request for electronic content 306 can be forwarded via the plugin to the proxy, which performs the NLP and related analyses. Optionally, the IRP system generates a relationship score and attaches the relationship score to the URL hyperlink at block 318, the relationship score indicating the proportion of electronic content 306 determined to have been previously consumed by the user. The IPR system can send a message indicating the relationship score and asking the user whether the user wishes to load electronic content 306. The electronic presentation structure for presenting electronic content 306 to the user is restructured at block 320 in response to a determination that some portions of the electronic content 306 were previously consumed by the user.

Referring additionally to FIG. 4, an example restructuring of an electronic presentation structure comprising text document 400 is depicted. Based on the above-described operative aspects 300 performed by the IRP system, portions within text document 400 are identified as corresponding to information previously consumed by the user. Text document 400 is restructured as electronic presentation structure 402, which contrasts portions previously consumed with portions of electronic content newly presented to the user. Electronic presentment structure 402, a modification or restructuring of text document 400, comprises distinct portions 404, 406, 408, and 410. Illustratively, each portion 404-410 is uniquely highlighted with distinct shadings to indicate portions of the information previously consumed. The highlight colors can correspond to different topics within the text document, the differences in the highlight shadings can indicate the length of time since the corresponding portion (by topic) was consumed. For example, text document 400 may be news article about a new virus. In response to the user submitting an electronic request for text document 400 via a data communications network, the IRP system determines portions that were previously consumed. Distinct portions 404, 406, 408, and 410 can be highlighted with different shadings to indicate both the portions previously consumed and the topic to which each pertains.

FIG. 5 is a flowchart of method 500 of recognizing and presenting information electronically according to an embodiment. Method 500 can be performed by the same or similar systems as described with reference to FIGS. 1 and 2. The system at block 502 analyzes electronic media content embedded in an electronic presentment structure presented to a user. The electronic media content can be presented in electronic documents, audio recordings, video recordings, multimedia presentations, CD-ROMs, as online content, and the like that is typically presented in a digital format, but in certain embodiments can include analog data.

Based on the analyzing, the system detects at block 504 portions of the electronic media content previously consumed by the user. At block 506, the system modifies the electronic presentment structure based on the detecting. The electronic presentment structure is modified to distinguish the electronic media content previously consumed by the user from other portions of the electronic media content.

If the electronic presentment structure comprises an audio or video file, the system can modify the electronic presentment structure by accelerating the speed that the audio or video is rendered. Accelerating the speed with respect to the portions of the electronic media content previously consumed by the user, allows the user to move rapidly through the electronic media content without having to re-read or view anew previously consumed portions of the electronic media content. Alternatively, or additionally, in other embodiments, the system can condense audio or video to eliminate the portions of the electronic media content previously consumed by the user.

If the electronic presentment structure comprises text, the system can modify the electronic presentment structure by annotating the text to distinguish portions of the text corresponding to portions of the electronic media content previously consumed by the user from portions of the text not previously consumed by the user. In other embodiments, the system can alternatively, or additionally, modify the electronic presentment structure by reformatting one or more formatting tags to distinguish portions of the text corresponding to portions of the electronic media content previously consumed by the user from portions of the text not previously consumed by the user.

In still other embodiments, the system alternatively or additionally can modify the electronic presentment structure by extracting portions of the text corresponding to portions of the electronic media content previously consumed by the user. Optionally, the system can substitute a link for the portions extracted. The link can electronically connect a user (e.g., via a data communications network) to a database in which the portions extracted are electronically stored. The system can communicate the link to the user with an instruction instructing the user link to the database if the user wishes to restore to the electronic presentment structure the portions extracted. A notification provided by the system to the user can indicate that the portion extracted was previously consumed by the user and ask whether the user wishes to consume the extracted portions again, in which event the user can do so using the system-provided link. The notification can indicate when or how long ago that the user consumed the extracted portions.

FIG. 6 is a flowchart of method 600 of recognizing and presenting information electronically according to an embodiment. Method 600 can be performed by the same or similar systems as described with reference to FIGS. 1 and 2. The system at block 602 performs natural language processing (NLP) on a machine-encoded file to determine one or more file segment classifiers. The machine-encoded file can be retrieved by a user via a data communications network.

At block 604 the system detects, within the machine-encoded file, previously consumed content corresponding to the one or more file segment classifiers by performing a computer database search for NLP elements identified within electronic content previously presented to a user that match NLP elements extracted from the machine-encoded file. The search is performed with respect to a user-specific consumption corpus database.

Based on the detecting, the system at block 606 modifies an electronic presentment structure for presenting the machine-encoded file to a user electronically. The electronic presentment structure is modified to distinguish portions corresponding to the previously consumed content within the machine-encoded file from other portions of the machine-encoded file.

In some embodiments, the system modifies the electronic presentment structure in response to determining a contextual basis of the one or more file segment classifiers. The one or more file segment classifiers can correspond to one or more topics of interest to the user. In some embodiments, the system discovers the topics of interest automatically by performing unsupervised machine learning topic modeling. Using topic modeling, the system discovers the topics of interest to the user based on a plurality of machine-encoded files previously retrieved by the user via a data communications network.

In other embodiments, the one or more file segment classifiers correspond to one or more topics of interest to the user that the system identifies by performing supervised machine learning topic classifying. The system identifies topics based on classifications performed by a topic classifier, which is trained with machine learning using a consumption corpus comprising electronic content selected by the user.

In still other embodiments, the electronic content previously presented comprises one or more machine-encoded files previously retrieved via a data communications network within a user-specified time interval.

In yest other embodiments, the system modifies the electronic presentment structure by annotating the electronic presentment structure with a relationship score. The system generates the relationship score by determining what proportion of the machine-encoded file comprises previously consumed content.

Figure 7:
FIG. 7 is a flowchart of an example method of recognizing and presenting information electronically in the context of a specific location of a user according to an embodiment.

FIG. 7 is a flowchart of example method 700 of recognizing and presenting information electronically in the context of a specific location of a user according to an embodiment. Method 700 can be performed by the same or similar systems as described with reference to FIGS. 1 and 2. The system at bloc 702 electronically tracks locations of a device used to receive and present the electronic presentment structure to the user electronically. At block 704, the system modifies the electronic presentment structure based on the location of the device.

FIG. 8 is a flowchart of example method 800 of detecting updates to portions of information previously presented to a user according to an embodiment. Method 800 can be performed by the same or similar systems as described with reference to FIGS. 1 and 2. The system at block 802 detects one or more revisions to a machine-encoded file after earlier retrieval of the machine-encoded file by the user. At block 804, the system responds to the detecting one or more revisions by presenting the machine-encoded file using another electronic presentment structure that indicates which portions are newly added or revised. In some embodiments, the system can automatically timestamp a link to a site from which the user accesses the machine-encoded file and record the version. If a new version of the machine-encoded file is generated, the system can detect the revisions by performing the topic analysis and natural language processing described herein to discover whether a newly generated version associated with the link contains portions not previously consumed by the user. Based on detecting portions not previously consumed, the system can communicate with the user. The system can indicate to the user which portions of the revised version are newly presented, enabling the user to access the newly presented information without having to consume again portions already consumed as the user wishes.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
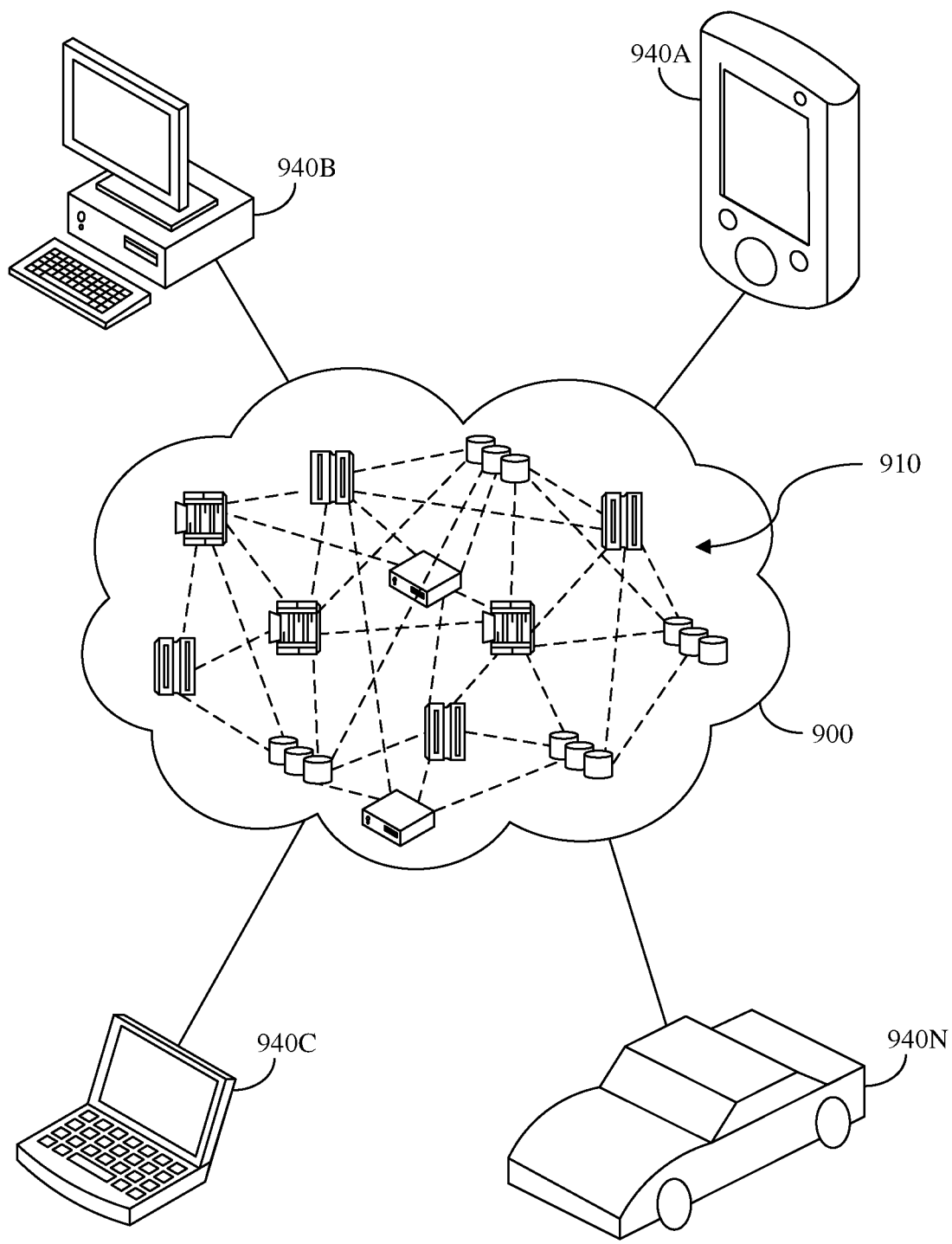
FIG. 9 depicts a cloud computing environment according to an embodiment.

Referring now to FIG. 9, illustrative cloud computing environment 900 is depicted. As shown, cloud computing environment 900 includes one or more cloud computing nodes 910 with which local computing devices used by cloud consumers, such as, for example, personal digital assistant (PDA) or cellular telephone 940a, desktop computer 940b, laptop computer 940c, and/or automobile computer system 940n may communicate. Computing nodes 910 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 940a-n shown in FIG. 9 are intended to be illustrative only and that computing nodes 910 and cloud computing environment 900 can communicate with any type of computerized device over any type of network and/or network addressable connection (e.g., using a web browser).

Figure 10:
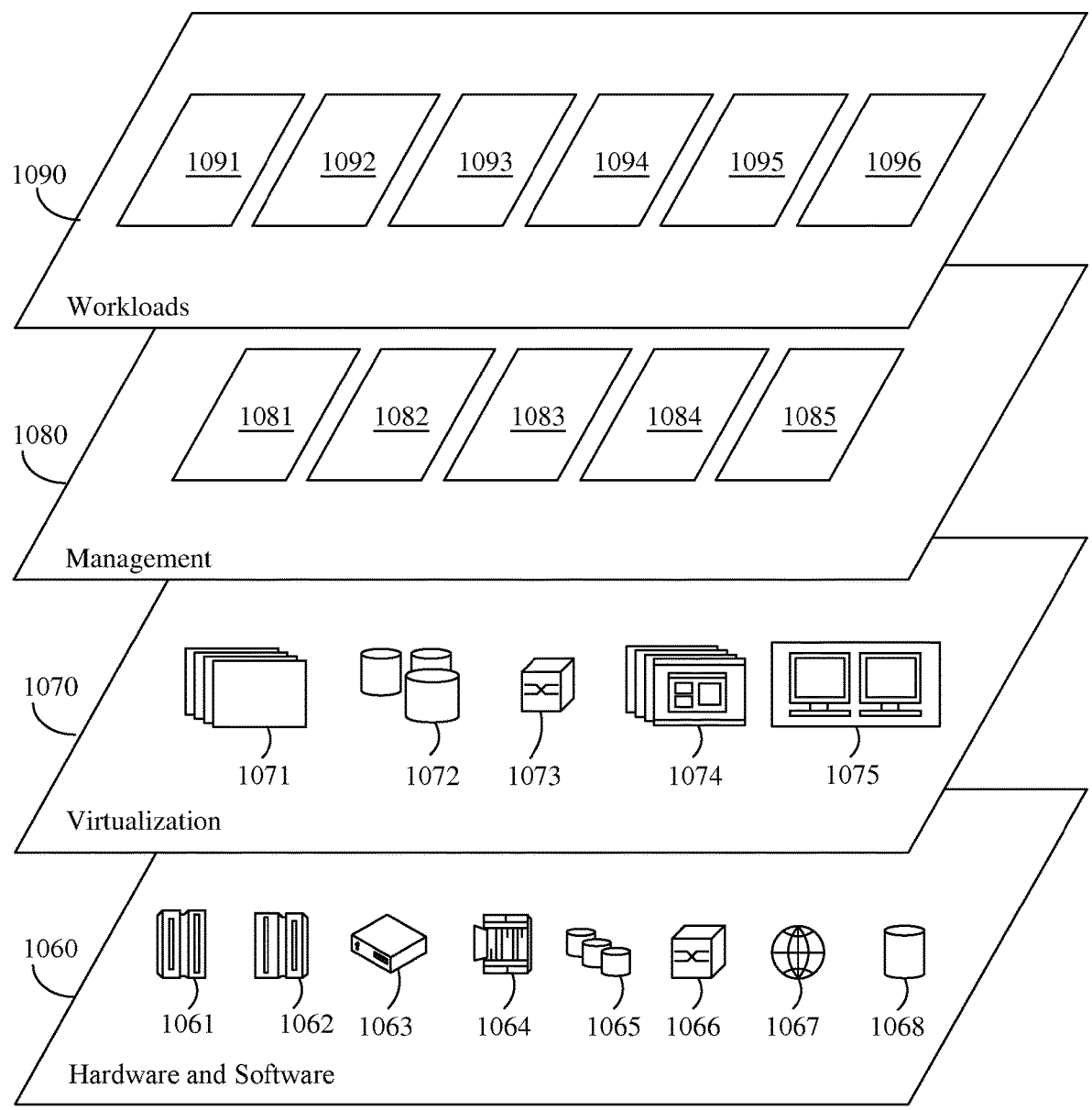
FIG. 10 depicts abstraction model layers according to an embodiment.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes 1061; RISC (Reduced Instruction Set Computer) architecture-based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and IPR system 1096.

FIG. 11 illustrates a schematic of an example of a computing node 1100. In one or more embodiments, computing node 1100 is an example of a suitable cloud computing node. Computing node 1100 is not intended to suggest any limitation as to the scope of use or functionality of embodiments of the invention described herein. Computing node 1100 is capable of performing any of the functionality described within this disclosure.

Computing node 1100 includes a computer system 1112, which is operational with numerous other general-purpose or special-purpose computing system environments or configurations. Examples of well-known computing systems, environments, and/or configurations that may be suitable for use with computer system 1112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system 1112 may be described in the general context of computer system-executable instructions, such as program modules, being executed by a computer system. Generally, program modules may include routines, programs, objects, components, logic, data structures, and so on that perform particular tasks or implement particular abstract data types. Computer system 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system 1112 is shown in the form of a general-purpose computing device. The components of computer system 1112 may include, but are not limited to, one or more processors 1116, a memory 1128, and a bus 1118 that couples various system components including memory 1128 to processor 1116. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 1118 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 1112 typically includes a variety of computer system-readable media. Such media may be any available media that is accessible by computer system 1112, and may include both volatile and non-volatile media, removable and non-removable media.

Memory 1128 may include computer system readable media in the form of volatile memory, such as random-access memory (RAM) 1130 and/or cache memory 1132. Computer system 1112 may further include other removable/non-removable, volatile/non-volatile computer system storage media. By way of example, storage system 1134 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein. For example, one or more of the program modules may include IPR system 996 or portions thereof.

Program/utility 1140 is executable by processor 1116. Program/utility 1140 and any data items used, generated, and/or operated upon by computer system 1112 are functional data structures that impart functionality when employed by computer system 1112. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 1112 may also communicate with one or more external devices 1114 such as a keyboard, a pointing device, a display 1124, etc.; one or more devices that enable a user to interact with computer system 1112; and/or any devices (e.g., network card, modem, etc.) that enable computer system 1112 to communicate with one or more other computing devices. Such communication can occur via input/output (I/O) interfaces 1122. Still, computer system 1112 can communicate with one or more networks such as a local area network (LAN), a general wide area network (WAN), and/or a public network (e.g., the Internet) via network adapter 1120. As depicted, network adapter 1120 communicates with the other components of computer system 1112 via bus 1118. It should be understood that although not shown, other hardware and/or software components could be used in conjunction with computer system 1112. Examples, include, but are not limited to: microcode, device drivers, redundant processing units, external disk drive arrays, RAID systems, tape drives, and data archival storage systems, etc.

While computing node 1100 is used to illustrate an example of a cloud computing node, it should be appreciated that a computer system using an architecture the same as or similar to that described in connection with FIG. 11 may be used in a non-cloud computing implementation to perform the various operations described herein. In this regard, the example embodiments described herein are not intended to be limited to a cloud computing environment. Computing node 1100 is an example of a data processing system. As defined herein, "data processing system" means one or more hardware systems configured to process data, each hardware system including at least one processor programmed to initiate operations and memory.

Computing node 1100 is an example of computer hardware. Computing node 1100 may include fewer components than shown or additional components not illustrated in FIG. 11 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 1100 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

FIG. 12 illustrates an example portable device 1200 in accordance with one or more embodiments described within this disclosure. Portable device 1200 can include a memory 1202, one or more processors 1204 (e.g., image processors, digital signal processors, data processors), and interface circuitry 1206.

In one aspect, memory 1202, processor(s) 1204, and/or interface circuitry 1206 are implemented as separate components. In another aspect, memory 1202, processor(s) 1204, and/or interface circuitry 1206 are integrated in one or more integrated circuits. The various components of portable device 1200 can be coupled, for example, by one or more communication buses or signal lines (e.g., interconnects and/or wires). In one aspect, memory 1202 may be coupled to interface circuitry 1206 via a memory interface (not shown).

Sensors, devices, subsystems, and/or input/output (I/O) devices can be coupled to interface circuitry 1206 to facilitate the functions and/or operations described herein, including the generation of sensor data. The various sensors, devices, subsystems, and/or I/O devices may be coupled to interface circuitry 1206 directly or through one or more intervening I/O controllers (not shown).

For example, location sensor 1210, light sensor 1212, and proximity sensor 1214 can be coupled to interface circuitry 1206 to facilitate orientation, lighting, and proximity functions, respectively, of portable device 1200. Location sensor 1210 (e.g., a GPS receiver and/or processor) can be connected to interface circuitry 1206 to provide geo-positioning sensor data. Electronic magnetometer 1218 (e.g., an integrated circuit chip) can be connected to interface circuitry 1206 to provide sensor data that can be used to determine the direction of magnetic North for purposes of directional navigation. Accelerometer 1220 can be connected to interface circuitry 1206 to provide sensor data that can be used to determine change of speed and direction of movement of a device in three dimensions. Altimeter 1222 (e.g., an integrated circuit) can be connected to interface circuitry 1206 to provide sensor data that can be used to determine altitude. Voice recorder 1224 can be connected to interface circuitry 1206 to store recorded utterances.

Camera subsystem 1226 can be coupled to an optical sensor 1228. Optical sensor 1228 can be implemented using any of a variety of technologies. Examples of optical sensor 1228 include a charged coupled device (CCD), a complementary metal-oxide semiconductor (CMOS) optical sensor, and the like. Camera subsystem 1226 and optical sensor 1228 can be used to facilitate camera functions, such as recording images and/or video clips (hereafter "image data"). In one aspect, image data is a subset of sensor data.

Communication functions can be facilitated through one or more wireless communication subsystems 1230. Wireless communications subsystem(s) 1230 can include radio frequency receivers and transmitters, optical (e.g., infrared) receivers and transmitters, and so forth. The specific design and implementation of wireless communication subsystem(s) 1230 can depend on the specific type of portable device 1200 implemented and/or the communication network(s) over which portable device 1200 is intended to operate.

For purposes of illustration, wireless communication subsystem(s) 1230 may be designed to operate over one or more mobile networks (e.g., GSM, GPRS, EDGE), a Wi-Fi network that may include a WiMax network, a short-range wireless network (e.g., a Bluetooth network), and/or any combination of the foregoing. Wireless communication subsystem(s) 1230 can implement hosting protocols such that portable device 1200 can be configured as a base station for other wireless devices.

Audio subsystem 1232 can be coupled to a speaker 1234 and a microphone 1236 to facilitate voice-enabled functions, such as voice recognition, voice replication, digital recording, audio processing, and telephony functions. Audio subsystem 1232 is able to generate audio type sensor data. In one or more embodiments, microphone 1236 may be utilized as a respirator sensor.

I/O devices 1238 can be coupled to interface circuitry 1206. Examples of I/O devices 1238 include, for example, display devices, touch-sensitive display devices, track pads, keyboards, pointing devices, communication ports (e.g., USB ports), network adapters, buttons or other physical controls, and so forth. A touch-sensitive device such as a display screen and/or a pad is configured to detect contact, movement, breaks in contact, and the like using any of a variety of touch sensitivity technologies. Example touch-sensitive technologies include, for example, capacitive, resistive, infrared, and surface acoustic wave technologies, other proximity sensor arrays or other elements for determining one or more points of contact with a touch-sensitive device, and the like. One or more of I/O devices 1238 may be adapted to control functions of sensors, subsystems, and such of portable device 1200.

Portable device 1200 further includes a power source 1240. Power source 1240 able to provide electrical power to various elements of portable device 1200. In one embodiment, power source 1240 is implemented as one or more batteries. The batteries may be implemented using any of a variety of different battery technologies, whether disposable (e.g., replaceable) or rechargeable. In another embodiment, power source 1240 is configured to obtain electrical power from an external source and provide power (e.g., DC power) to the elements of portable device 1200. In the case of a rechargeable battery, power source 1240 further may include circuitry that is able to charge the battery or batteries when coupled to an external power source.

Memory 1202 can include random access memory (e.g., volatile memory) and/or non-volatile memory, such as one or more magnetic disk storage devices, one or more optical storage devices, flash memory, and so forth. Memory 1202 can store operating system 1252, such as LINUX, UNIX, a mobile operating system, an embedded operating system, and the like. Operating system 1252 may include instructions for handling system services and for performing hardware-dependent tasks.

Memory 1202 may store other program code 1254. Examples of other program code 1254 may include instructions to facilitate communicating with one or more additional devices, one or more computers, and/or one or more servers; graphic user interface processing; processing instructions to facilitate sensor-related functions; phone-related functions; electronic messaging-related functions; Web browsing-related functions; media processing-related functions; GPS and navigation-related functions; security functions; camera-related functions, including Web camera and/or Web video functions; and so forth. Memory 1202 may store an application comprising IPR program code 1256. Memory 1202 may also store one or more other applications 1258 as well.

The various types of instructions and/or program code described are provided for purposes of illustration and not limitation. The program code may be implemented as separate software programs, procedures, or modules. Memory 1202 can include additional instructions or fewer instructions. Moreover, various functions of portable device 1200 may be implemented in hardware and/or software, including in one or more signal processing and/or application-specific integrated circuits.

Program code stored within memory 1202 and any data used, generated, and/or operated on by portable device 1200 are functional data structures that impart functionality to a device when employed as part of the device. Further examples of functional data structures include, for example, sensor data, data obtained via user input, data obtained via querying external data sources, baseline information, and so forth. The term "data structure" refers to a physical implementation of a data model's organization of data within a physical memory. As such, a data structure is formed of specific electrical or magnetic structural elements within a memory. A data structure imposes physical organization on the data stored in the memory that is used by a processor.

In certain embodiments, one or more of the various sensors and/or subsystems described with reference to portable device 1200 may be separate devices that are coupled or communicatively linked to portable device 1200 through wired or wireless connections. For example, one or more (or all) of location sensor 1210, light sensor 1212, proximity sensor 1214, gyroscope 1216, magnetometer 1218, accelerometer 1220, altimeter 1222, voice recorder 1224, camera subsystem 1226, audio subsystem 1232, and so forth may be implemented as separate systems or subsystems that operatively couple to portable device 1200 by way of I/O devices 1238 and/or wireless communication subsystem(s) 1230.

Portable device 1200 can include fewer components than those shown or include additional components other than those shown in FIG. 12 depending on the specific type of system that is implemented. Additionally, the particular operating system and/or application(s) and/or other program code included may also vary according to system type. Moreover, one or more of the illustrative components can be incorporated into, or otherwise form a portion of, another component. For example, a processor may include at least some memory.

Portable device 1200 is provided for purposes of illustration and not limitation. A device and/or system configured to perform the operations described herein may have a different architecture than illustrated in FIG. 12. The architecture may be a simplified version of portable device 1200 and may include a processor and memory storing instructions. The architecture may include one or more sensors as described herein. Portable device 1200, or a similar system, can collect data using the various sensors of the device or sensors coupled thereto. It should be appreciated, however, that portable device 1200 may include fewer sensors or other additional sensors. With this disclosure, data generated by a sensor is referred to as "sensor data."

Example implementations of portable device 1200 include, for example, a smartphone or other mobile device or phone, a wearable computing device (e.g., smartwatch), a dedicated medical device or other suitable handheld, wearable, or comfortably carriable electronic device, capable of sensing and processing sensor-detected signals and data. It will be appreciated that embodiments can be deployed as a standalone device or deployed as multiple devices in a distributed client-server networked system. For example, in certain embodiments, a smartwatch can operatively couple to a mobile device (e.g., smartphone). The mobile device may or may not be configured to interact with a remote server and/or computer system.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    performing natural language processing (NLP) on a machine-encoded file to determine one or more file segment classifiers, wherein the machine-encoded file is retrieved via a data communications network;
    detecting, within the machine-encoded file, previously consumed content corresponding to the one or more file segment classifiers by performing a computer database search for NLP elements identified within electronic content previously presented to a user that match NLP elements extracted from the machine-encoded file, wherein the computer database search is performed with respect to a user-specific consumption corpus database; and
    based on the detecting, modifying an electronic presentment structure for presenting the machine-encoded file to a user electronically, wherein the electronic presentment structure is modified to distinguish portions corresponding to the previously consumed content within the machine-encoded file from other portions of the machine-encoded file.

2. The method of claim 1, wherein the modifying an electronic presentment structure is performed in response to determining a contextual basis of the one or more file segment classifiers.

3. The method of claim 1, further comprising:
electronically tracking locations of a device used to receive and present the electronic presentment structure to the user electronically; and
modifying the electronic presentment structure based on the location of the device.

4. The method of claim 1, further comprising:
subsequently detecting one or more revisions to the machine-encoded file after retrieval of the machine-encoded file by the user; and
responsive to the detecting one or more revisions, presenting the machine-encoded file using another electronic presentation structure that indicates which portions are newly added or revised.

5. The method of claim 1, wherein the one or more file segment classifiers correspond to one or more topics of interest to the user discovered by performing unsupervised machine learning topic modeling, and wherein the unsupervised machine learning topic modeling discovers the one or more topics of interest to the user based on a plurality of machine-encoded files retrieved by the user via the data communications network.

6. The method of claim 1, wherein the one or more file segment classifiers correspond to one or more topics of interest to the user identified by performing supervised machine learning topic classifying, and wherein the supervised machine learning topic classifying identifies topics designated by a user in advance of retrieving the machine-encoded file.

7. The method of claim 1, wherein the electronic content previously presented comprises one or more machine-encoded files previously retrieved via a data communications network within a user-specified time interval.

8. A computer-implemented method, comprising:
analyzing electronic media content embedded in an electronic presentment structure presented to a user;
detecting, based on the analyzing, one or more portions of the electronic media content previously consumed by the user; and
modifying the electronic presentment structure, based on the detecting the one or more portions of the electronic media content previously consumed by the user, to distinguish the one or more portions of the electronic media content previously consumed by the user from other portions of the electronic media content.

9. The method of claim 8, wherein based on the electronic presentment structure comprising audio or video, the modifying includes:
accelerating an audio or video rendering speed with respect to the one or more portions of the electronic media content previously consumed by the user; and/or
condensing the audio or video to eliminate the one or more portions of the electronic media content previously consumed by the user.

10. The method of claim 8, wherein based on the electronic presentment structure comprising text, the modifying includes:
annotating the text to distinguish portions of the text corresponding to the one or more portions of the electronic media content previously consumed by the user from other portions of the text;
modifying one or more formatting tags to alter a format of the text corresponding to the one or more portions of the electronic media content previously consumed by the user from the other portions of the text; or
extracting portions of the text corresponding to the one or more portions of the electronic media content previously consumed by the user.

11. The method of claim 10, wherein the extracting includes substituting a link for the portions extracted, the link to a database wherein the portions extracted are electronically stored, and providing an instruction instructing the user to link to the database to restore to the electronic presentment structure the portions extracted.

12. A computer-implemented method, comprising:
detecting one or more revisions to a machine-encoded file after a prior retrieval of an earlier version of the machine-encoded file by a user via a data communications network, wherein the detecting includes a comparison of natural language processing (NLP) elements identified within electronic content of the earlier version of the machine-encoded file and NLP elements identified within electronic content of a revised version of the machine-encoded file; and
based on detecting one or more revisions, presenting the machine-encoded file using another electronic presentment structure that indicates which portions are newly added or revised.

13. A system, comprising:
a processor configured to initiate operations including:
performing natural language processing (NLP) on a machine-encoded file to determine one or more file segment classifiers, wherein the machine-encoded file is retrieved via a data communications network;
detecting, within the machine-encoded file, previously consumed content corresponding to the one or more file segment classifiers by performing a computer database search for NLP elements identified within electronic content previously presented to a user that match NLP elements extracted from the machine-encoded file, wherein the computer database search is performed with respect to a user-specific consumption corpus database; and
based on the detecting, modifying an electronic presentment structure for presenting the machine-encoded file to a user electronically, wherein the electronic presentment structure is modified to distinguish portions corresponding to the previously consumed content within the machine-encoded file from other portions of the machine-encoded file.

14. The system of claim 13, wherein the modifying an electronic presentment structure is performed in response to determining a contextual basis of the one or more file segment classifiers.

15. The system of claim 13, wherein the processor is configured to initiate further operations including:
electronically tracking locations of a device used to receive and present the electronic presentment structure to the user electronically; and
modifying the electronic presentment structure based on the location of the device.

16. The system of claim 13, wherein the processor is configured to initiate further operations including:
subsequently detecting one or more revisions to the machine-encoded file after retrieval of the machine-encoded file by the user; and responsive to the detecting one or more revisions, presenting the machine-encoded file using another electronic presentment structure that indicates which portions are newly added or revised.

17. The system of claim 13, wherein the one or more file segment classifiers correspond to one or more topics of interest to the user discovered by performing unsupervised machine learning topic modeling, and wherein the unsupervised machine learning topic modeling discovers the one or more topics of interest to the user based on a plurality of machine-encoded files retrieved by the user via the data communications network.

18. The system of claim 13, wherein the one or more file segment classifiers correspond to one or more topics of interest to the user identified by performing supervised machine learning topic classifying, and wherein the supervised machine learning topic classifying identifies topics designated by a user in advance of retrieving the machine-encoded file.

19. A computer program product, the computer program product comprising:
one or more computer-readable storage media and program instructions collectively stored on the one or more computer-readable storage media, the program instructions executable by a processor to cause the processor to initiate operations including:
performing natural language processing (NLP) on a machine-encoded file to determine one or more file segment classifiers, wherein the machine-encoded file is retrieved via a data communications network;
detecting, within the machine-encoded file, previously consumed content corresponding to the one or more file segment classifiers by performing a computer database search for NLP elements identified within electronic content previously presented to a user that match NLP elements extracted from the machine-encoded file, wherein the computer database search is performed with respect to a user-specific consumption corpus database; and
based on the detecting, modifying an electronic presentment structure for presenting the machine-encoded file to a user electronically, wherein the electronic presentment structure is modified to distinguish portions corresponding to the previously consumed content within the machine-encoded file from other portions of the machine-encoded file.

20. The computer program product of claim 19, wherein the modifying an electronic presentment structure is performed in response to determining a contextual basis of the one or more file segment classifiers.

21. The computer program product of claim 19, further comprising:
electronically tracking locations of a device used to receive and present the electronic presentment structure to the user electronically; and
modifying the electronic presentment structure based on the location of the device.

22. The computer program product of claim 19, further comprising:
subsequently detecting one or more revisions to the machine-encoded file after retrieval of the machine-encoded file by the user; and
responsive to the determining one or more revisions, presenting the machine-encoded file using another electronic presentment structure that indicates which portions are newly added or revised.

23. The computer program product of claim 19, wherein the one or more file segment classifiers correspond to one or more topics of interest to the user discovered by performing unsupervised machine learning topic modeling, and wherein the unsupervised machine learning topic modeling discovers the one or more topics of interest to the user based on a plurality of machine-encoded files retrieved by the user via the data communications network.

24. The computer program product of claim 19, wherein the one or more file segment classifiers correspond to one or more topics of interest to the user identified by performing supervised machine learning topic classifying, and wherein the supervised machine learning topic classifying identifies topics designated by a user in advance of retrieving the machine-encoded file.

25. The computer program product of claim 19, wherein the electronic content previously presented comprises one or more machine-encoded files previously retrieved via a data communications network within a user-specified time interval.

* * * * *